No. 609,174. Patented Aug. 16, 1898.
G. S. THURSTON.
BICYCLE SUPPORT.
(Application filed May 6, 1897.)
(No Model.)
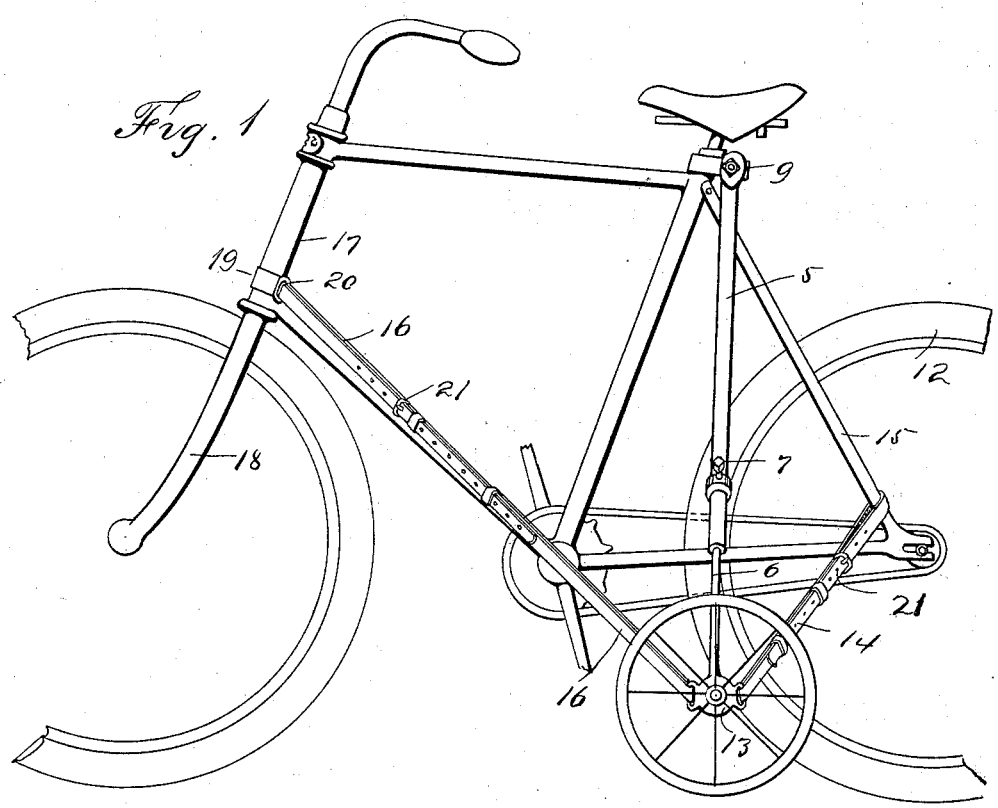
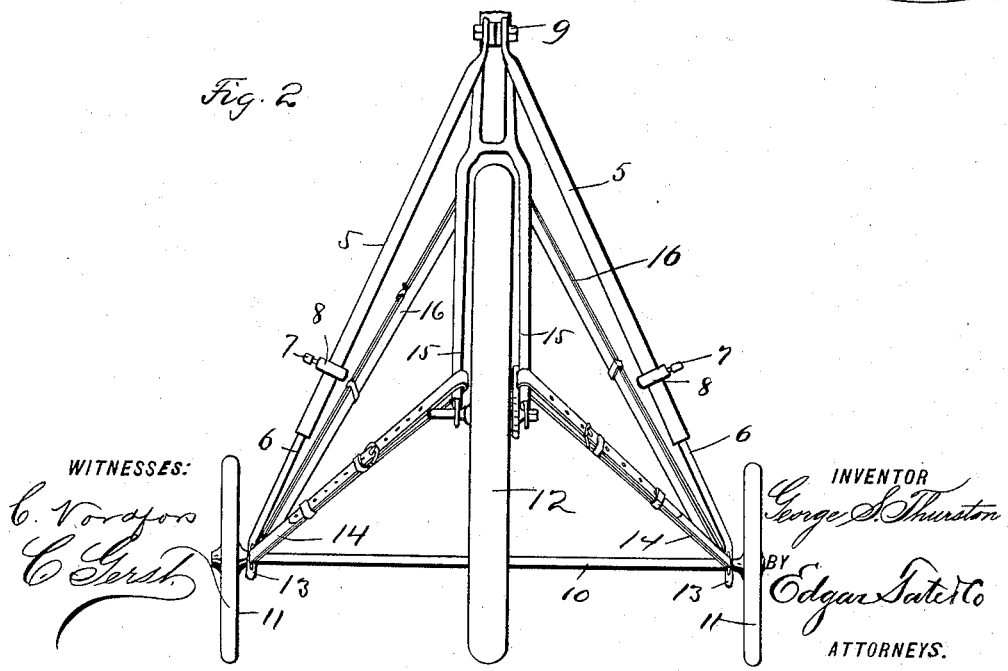
WITNESSES:
INVENTOR
George S. Thurston
BY
Edgar Tate & Co
ATTORNEYS.
THE NORRIS PETERS CO., PHOTO-LITHO., WASHINGTON, D. C.

UNITED STATES PATENT OFFICE.

GEORGE SOLOMON THURSTON, OF SANTA ROSA, CALIFORNIA.

BICYCLE-SUPPORT.

SPECIFICATION forming part of Letters Patent No. 609,174, dated August 16, 1898.

Application filed May 6, 1897. Serial No. 635,337. (No model.)

*To all whom it may concern:*

Be it known that I, GEORGE SOLOMON THURSTON, a citizen of the United States, residing at Santa Rosa, in the county of Sonoma and State of California, have invented certain new and useful Improvements in Supports for Bicycles, of which the following is a full and complete specification, such as will enable those skilled in the art to which it appertains to make and use the same.

This invention relates to supports for bicycles; and the object thereof is to provide an improved device of this class by means of which a bicycle may be held in an upright position, a further object being to provide an improvement of this class which is particularly adapted for use by beginners in learning to ride and which may also be used at all times, if desired.

The invention is fully disclosed in the following specification, of which the accompanying drawings form a part, in which—

Figure 1 is a side view of a bicycle provided with my improvement, and Fig. 2 a rear view thereof.

In the drawings forming part of this specification the separate parts of my improvement are designated by the same numerals of reference in each of the views, and in said drawings I have shown a bicycle of the usual construction and provided with what is known as a "diamond" frame, and in the practice of my invention I secure to the upper rear portion of the frame, or preferably to the saddle-post immediately beneath the seat and at each side of said frame, downwardly and outwardly directed tubular supports 5, which are open at their lower ends and provided with rods 6, which are free to slide therein, and the rods 6 are adapted to be adjusted in any desired position and to be held in place by set-screws 7, which pass through collars 8, secured to the tubular supports 5, near the lower end thereof.

The upper ends of the tubular supports 5 are pivotally connected with the frame or saddle-post at 9 and are free to swing on said pivotal connection, and mounted in the lower ends of the rods 6 is a shaft 10, which is provided with wheels 11, and the wheels 11 are adapted to bear upon the ground on the opposite sides of the main drive-wheel 12.

The lower ends of the rods 6 are provided with circular heads 13, through which the shaft 10 passes, and connected with the rear sides of said circular heads are straps 14, which are passed around the lower ends of the sides 15 of the rear fork, and connected with the forward side of said circular heads 13 are straps 16, which are connected with the lower portion of the tubular head 17 of the frame, through which the stem of the forward fork 18 passes.

The straps 16 are connected with the tubular head 7 of the frame by means of a band 19, which is provided at its opposite sides with rings or eyes 20, and the straps 14 and 16 are each provided with buckles, as shown at 21, and it will be apparent that said straps may be tightened or loosened or adjusted to any desired position.

In Fig. 2 I have shown the shaft 10 as passing directly in front of and beneath the central portion of the drive-wheel 12; but by reason of the manner in which said shaft is supported it will be apparent that it may be drawn forwardly and occupy a position farther to the front than that shown in Fig. 1, if desired, the only object in this connection being to support said shaft 10, so that it, together with the straps 16, will not interfere with the operation of the pedals, and it will also be apparent that the shaft 10 may be made proportionally shorter than is shown in Fig. 2, and other changes in and modifications of the construction herein described may be made without departing from the spirit of my invention or sacrificing its advantages. It will also be apparent that this device will serve to support the vehicle and prevent the same from falling, and said device may be used by beginners or by any other party or parties when riding a vehicle of the class described.

Having fully described my invention, I claim as new and desire to secure by Letters Patent—

1. The combination with the upper rear portion of the frame or saddle-post of a bicycle, of tubular supports connected therewith, and projecting downwardly and outwardly, adjustable rods mounted in the lower ends of said supports, a shaft mounted in the lower ends of said rods, and provided with wheels at its opposite ends and flexible and adjustable straps connecting each end of said shaft with the forward and rear portions of the frame of the bicycle, substantially as shown and described.

2. The herein-described support for bicycles comprising two tubes secured to the frame or saddle-post beneath the seat, rods telescopically mounted therein, an axle extending transversely of the bicycle in front of the rear wheel, small wheels mounted upon the outer end of said axle, said telescopic rod being connected with said axle by means of circular heads and straps connected with each of said heads and with the corresponding side of the rear fork of the frame and a second strap secured to each of said heads and to an attachment mounted on the forward end of the frame said straps being adjustable, substantially as and for the purpose described.

In testimony that I claim the foregoing as my invention I have signed my name, in presence of the subscribing witnesses, this 28th day of April, 1897.

GEORGE SOLOMON THURSTON.

Witnesses:
E. D. SWEETSER,
L. E. RICKSECKER.